(12) United States Patent
Nakamoto

(10) Patent No.: US 7,498,382 B2
(45) Date of Patent: Mar. 3, 2009

(54) EMULSION, PRODUCTION METHOD THEREOF AND USE THEREOF

(75) Inventor: Keiichi Nakamoto, Osaka (JP)

(73) Assignee: Nippon Shokubai Co., Ltd., Osaka-Shi (JP)

( * ) Notice: Subject to any disclaimer, the term of this patent is extended or adjusted under 35 U.S.C. 154(b) by 603 days.

(21) Appl. No.: 11/139,683

(22) Filed: May 31, 2005

(65) Prior Publication Data

US 2005/0267256 A1 Dec. 1, 2005

(30) Foreign Application Priority Data

May 31, 2004 (JP) ............................. 2004-162088
Feb. 2, 2005 (JP) ............................. 2005-026212

(51) Int. Cl.
*C08G 73/02* (2006.01)

(52) U.S. Cl. ..................... 524/800; 524/832; 524/833

(58) Field of Classification Search ................. 524/800, 524/832, 833
See application file for complete search history.

(56) References Cited

U.S. PATENT DOCUMENTS

| 5,081,166 A | 1/1992 | Kiehlbauch et al. |
| 5,688,869 A | 11/1997 | Sullivan |
| 5,744,540 A | 4/1998 | Baumstark et al. |
| 6,211,282 B1 | 4/2001 | Yamashita et al. |
| 2001/0005733 A1 | 6/2001 | Yamashita et al. |

FOREIGN PATENT DOCUMENTS

| CN | 1215073 A | 4/1999 |
| CN | 1398931 | 2/2003 |
| CN | 1177900 C | 12/2004 |
| EP | 0 444 791 | 9/1991 |
| JP | 5-202321 | 8/1993 |
| JP | 10-310739 A | 11/1998 |
| JP | 11-343464 A | 12/1999 |
| JP | 2000-204285 A | 7/2000 |
| KR | 2003-0031364 | 4/2003 |

*Primary Examiner*—Edward J Cain
(74) *Attorney, Agent, or Firm*—Connolly Bove Lodge & Hutz LLP

(57) ABSTRACT

It is an object of the present invention to provide an emulsion which can form a coating excellent in water penetration resistance as well as impregnating adhesion property, its production method, and a structure body using the emulsion. The present invention is directed to an emulsion comprising a hydrophobic resin particle (A) dispersed in a water-based medium as a resin component, wherein 20 to 60% by weight in the entire resin components including the hydrophobic resin particles (A) is a polymer emulsifier (B) and the average particle diameter of the particles contained therein is 50 nm or smaller.

20 Claims, No Drawings

EMULSION, PRODUCTION METHOD THEREOF AND USE THEREOF

TECHNICAL FIELD

Present invention relates to an emulsion excellent in water penetration resistance and adhesion property and useful for water-based sealer, its production method, and a structure body using the emulsion.

BACKGROUND ART

For porous substrates to be used for tiles, concrete, inorganic construction materials and old (deteriorated) coating walls and the like, treatment of forming resin coatings on the surfaces of substrates has mainly been carried out in order to reinforce or fill substrate surface layers. As a sealer to be used in such a case, in general, solvent type sealers have conventionally been used. However in recent years, use of organic solvents tends to be restricted more strictly and shift to water-based coating materials is desired. In such a situation, it has been required to develop water-based sealers comprising emulsions.

So far, as water-based sealers, the following have been proposed: for examples, as described in Japanese Kokai Publicaion Hei-10-310739, water-based undercoating agent which comprises a water-based medium and copolymer dissolved therein and obtained by copolymerizing monomer mixtures containing (a) 8 to 70% by weight of an ethylenic unsaturated carboxylic acid, (b) 30 to 92% by weight of at least one monomer selected from a group consisting of acrylic acid or methacrylic acid ester with alkyl having 1 to 18 carbon atoms, aromatic vinyl compound, vinyl halide, saturated carboxylic acid vinyl ester, acrylonitrile, methacrylonitrile, ethylene, and butadiene, and (c) 0 to 20% by weight of other monomers and which are characterized in that 30% or more of the above-mentioned ethylenic unsaturated carboxylic acid (a) exists in neutralized state by addition of an alkali and as described in Japanese Kokai Publication 2000-204285, water-based sealer containing, as basic resin component, water-based mixed resin solution of synthetic resin emulsion (I) and water-soluble resin solution (II). Also, as resin compositions suitable for water-based indoor coating material, there are proposed resin composition for water-based coating material, as described in Japanese Kokai Publicaiton Hei-11-343464, each comprising (A) a water-based emulsion of copolymer having a lowest film formation temperature and a glass transition temperature in respectively specified ranges and (B) a resin having a glass transition temperature in a specified range and made solubilized in water by an alkali and weight ratio A/B on the basis of non-volatile components in (A) and (B) being in a range of 95/5 to 60/40.

However, the above-mentioned conventionally known water-based sealers contain, as main components, polymers with high water solubility in order to keep high impregnating adhesion property. Therefore, as compared with conventionally widely employed solvent type sealers, there is a disadvantage that they are considerably inferior in water penetration resistance.

Further, in conventional techniques essentially using a water-soluble resin and an emulsion, the particles in the emulsion are relatively large in general and coatings are formed by filling gaps among large particles with the water-soluble resin and such coating is provided only with insufficient water permeation resistance as compared with solvent type sealers in present situation. To say more particularly, conventionally, it has been well known that the particle diameter of particles in an emulsion can be controlled to be small by increasing the amount of a surfactant, but on the other hand, it also has been well known that the existence of a large quantity of a surfactant causes decrease of water penetration resistance and in the case of aiming to improve the water penetration resistance, making the particle diameter of an emulsion small by using a large quantity of a surfactant has been supposed to be rather disadvantageous in terms of water penetration resistance. Additionally, in conventional techniques essentially using a water-soluble resin and an emulsion, selective use of alkali-soluble one as the water-soluble resin may be possible to improve the water penetration resistance, however water penetration resistance as high as that of a solvent type sealer has not been obtained yet.

Accordingly, it has been required to improve the water penetration resistance of a water-based sealer to be as high as that of a solvent type sealer and to satisfy the requirement, it has been desired to develop an emulsion which can form a coating excellent in water penetration resistance as well as impregnating adhesion property.

SUMMARY OF THE INVENTION

In the described situation, the object of the present invention is to provide an emulsion which can form a coating excellent in water penetration resistance as well as impregnating adhesion property, its production method, and a structure body using the emulsion.

In view of the above state of the art, the inventors of the present invention have made intensive investigations to solve the above-mentioned problems and consequently have found that the problems can be solved all at once with respect to an emulsion comprising a hydrophobic resin particle (A) dispersed in a water-based medium and a polymer emulsifier (B) dissolved in the water-based medium as resin components, in a manner that the impregnating adhesion property is maintained by controlling the ratio (weight ratio) of the hydrophobic resin particle (A) and the polymer emulsifier (B) or the ratio (weight ratio) polymer emulsifier (B) in the entire resin components to be within a specified range and that the water penetration resistance is improved by forming a film in which particles are densely arranged by controlling the average particle diameter of particles contained in the emulsion to be as small as 50 nm or smaller. Inventors have also found it important for satisfying both the impregnating adhesion property and the water penetration resistance that the weight average molecular weight of the resin components are within a specified range if the ratio of the hydrophobic resin particle (A) and the polymer emulsifier (B) is within a specified range.

Further, the inventors have also found that this emulsion is excellent in hot water resistance, frost damage resistance, moisture penetration resistance, mud crack resistance and blocking resistance.

Further, as a method of easily obtaining an emulsion of particles with such a small average particle diameter as described above, conventionally, a method of increasing a surfactant is generally employed. However, decrease of the water penetration resistance is decreased in the case of the emulsion obtained by increasing the surfactant into consideration, and inventors of the invention have employed a method of polymerizing a monomer component (a) for forming the hydrophobic resin particle (A) in a specified amount of an aqueous solution of the polymer emulsifier (B) by using a water-soluble initiator and have found that the above-mentioned emulsion can easily obtained.

The invention is completed based on these findings.

That is, a first emulsion of the invention comprises a hydrophobic resin particle (A) dispersed in a water-based medium as a resin component, wherein 20 to 60% by weight in the entire resin components including the hydrophobic resin particles (A) is a polymer emulsifier (B) and the average particle diameter of the particles contained therein is 50 nm or smaller A second emulsion of the invention is an emulsion comprising a hydrophobic resin particle (A) dispersed in a water-based medium and a polymer emulsifier (B) dissolved in the water-based medium as resin components, wherein the ratio (weight ratio) of the hydrophobic resin particle (A) and the polymer emulsifier (B) satisfies [hydrophobic resin particles (A)]/[polymer emulsifier (B)]=40/60 to 80/20, the average particle diameter of the particles contained therein is 50 nm or smaller and the weight average molecular weight (Mw) of the resin components is in a range of 40,000 to 1,000,000.

In the present invention, since the resin components include two types; the hydrophobic resin particle (A) and the polymer emulsifier (B), the weight average molecular weight (Mw) of the resin components is determined as follows. That is, an emulsion resin composition is subjected to GPC (gel permeation chromatography) and the calculation is carried out from those all included in a range from a starting point (the point rising up from a base line) of a peak with the shorter retention time to the finishing point (the point turning back to the base line) of a peak with the longer retention time between two peaks (including the cases that these peaks are parted and overlapped) of the hydrophobic resin particle (A) and the polymer emulsifier (B) in the chart obtained by the GPC analysis.

A production method of the emulsion of the present invention is An production method of an emulsion comprising a hydrophobic resin particle (A) dispersed in a water-based medium and a polymer emulsifier (B) dissolved in the water-based medium as resin components, wherein the particles with an average particle diameter of 50 nm or smaller are produced by polymerization of monomer component (a) for forming the hydrophobic resin particle (A) in an aqueous solution (B') of the polymer emulsifier (B) by using a water-soluble initiator and the solid matter ratio (weight ratio) of the aqueous solution (B') and the monomer component (a) is adjusted to satisfy [monomer component (a)]/[aqueous solution (B')]=40/60 to 80/20. The structure body of the present invention is a structure body comprising a porous substrate and a coating formed on the surface of the substrate, wherein the coating is formed using the emulsion of the present invention.

According to the present invention, it is made possible to provide an emulsion capable of forming a coating excellent in water penetration resistance in addition to impregnating adhesion property, its production method, and a structure body using the emulsion.

DETAILED DESCRIPTION OF THE INVENTION

Hereinafter, an emulsion, its production method, and a structure body formed using the emulsion according to the present invention will be described more in detail. However, it is not intended that the scope of the present invention be limited to the following descriptions. Modifications and substitutions to the following exemplified specific conditions and structures can be made appropriately without departing from the intent and scope of the invention.

[Emulsion]

A first emulsion of the present invention comprises a hydrophobic resin particle (A) dispersed in a water-based medium as a resin component, wherein 20 to 60% by weight in the entire resin components including the hydrophobic resin particles (A) is a polymer emulsifier (B). The content of the polymer emulsifier (B) is preferably 20 to 55% by weight, more preferably 20 to 50% by weight, relative to the entire resin components. Use of the hydrophobic resin particles (A) makes it possible to form a coating with excellent water penetration resistance and addition of the polymer emulsifier (B) in a content of 20 to 60% by weight in the entire resin components makes it possible to foam a coating with excellent impregnating adhesion property. If the content of the polymer emulsifier (B) is 20% by weight or more in the entire resin components, it becomes easy to obtain a smooth coating and accordingly, it results in prevention of a coating defect that water penetrates the coating and exhibition of excellent water penetration resistance.

A second emulsion of the invention is an emulsion comprising a hydrophobic resin particle (A) dispersed in a water-based medium and a polymer emulsifier (B) dissolved in the water-based medium as resin components, wherein the ratio (weight ratio) of the hydrophobic resin particle (A) and the polymer emulsifier (B) satisfies [hydrophobic resin particles (A)]/[polymer emulsifier (B)]=40/60 to 80/20. The ratio of [hydrophobic resin particles (A)]/[polymer emulsifier (B)] is preferably 45/55 to 80/20, more preferably 50/50 to 80/20 and still more preferably 55/45 to 80/20. If the content of the hydrophobic resin particle (A) is less than the above-mentioned range, the water penetration resistance becomes insufficient and if the content of the hydrophobic resin particle (A) is higher than the above-mentioned range, the impregnating adhesion property becomes insufficient. If the content of the polymer emulsifier (B) is higher than the content which satisfies [hydrophobic resin particles (A)]/[polymer emulsifier (B)]=80/20 (weight ratio), it becomes easy to obtain a smooth coating and accordingly it results in prevention of a coating defect that water penetrates the coating and exhibition of excellent water penetration resistance.

With respect to the first and the second emulsions of the present invention, it is important that the particles to be contained have an average particle diameter of 50 nm or smaller. It is more preferably 45 nm or smaller and still more preferably 40 nm or smaller. If the average particle diameter of particles contained in the emulsions exceeds 50 nm, sufficient water penetration resistance can not be obtained. The lower limit of the average particle diameter of the particles contained in the emulsions is not particularly limited, however if it is too small, the viscosity is increased and handle of the emulsions may possibly become difficult, and it is therefore preferably 5 nm or larger and more preferably 10 nm or larger.

With respect to the second emulsion of the present invention, it is important that the weight average molecular weight (Mw) of the resin components [that is, the above-mentioned hydrophobic resin particle (A) and polymer emulsifier (B)] is 40,000 to 1,000,000. Preferably, it is 50,000 to 800,000. If the weight average molecular weight (Mw) of the resin components is less than 40,000, the aggregation force of the resin decreases and make it difficult to exhibit sufficient impregnating adhesion property and on the other hand, if it exceeds 1,000,000, film formability is deteriorated owing to insufficient leveling property to result in insufficient water penetration resistance. As described above, the weight average molecular weight (Mw) of the resin components are measured by analysis of the emulsion resin composition by GPC (gel permeation chromatography) and more particularly, it can be calculated by the method which will be described later in Examples. The weight average molecular weight (Mw) of the resin components [that is, the above-mentioned hydrophobic resin particles (A) and polymer emulsifier (B)] in the first emulsion of the invention is also preferable to be within in the above-mentioned range.

Hereinafter, the hydrophobic resin particle (A) and the polymer emulsifier (B) in the first and the second emulsions of the invention will be described more in detail.

The above-mentioned hydrophobic resin particle (A) is preferable to have a glass transition temperature in a range of −70 to 30° C. It is more preferably −60 to 25° C. If the glass transition temperature of the hydrophobic resin particle (A) is lower than −70° C., the coating strength becomes insufficient and the adhesion property tends to decrease. On the other hand, if it exceeds 30° C., the leveling property becomes worse to possibly result in difficulty of obtaining sufficient water penetration resistance.

In the present invention, the glass transition temperature (Tg (° C.)) of the hydrophobic resin particle (A) can be calculated from monomer components used for forming the hydrophobic resin particle (A) according to the following equations (1) and (2).

$$1/Tg(° K)=(W1/T1)+(W2/T2)+\ldots \quad (1)$$

$$Tg(° C.)=Tg(° K.)-273 \quad (2):$$

(in the equation (1), W1, W2, . . . represent % by weight of respective monomers used for (co)polymerization and T1, T2, . . . represent Tg (° K.) of the homopolymers of the respective monomers: Tg (° K.) represented by T1, T2, . . . of the homopolymers of the respective monomers may be given in J. Brandup, E. H. Immergut, Polymer Hand Book (Second Edition).

With respect to the above-mentioned hydrophobic resin particle (A), the ratio of a constituent unit derived from an acid group-containing unsaturated monomer (hereinafter, referred to as acid group-containing amount in some cases) is preferably 1% by weight or lower in the entire constituent units. 0.8% by weight or lower is more preferable. If the acid group-containing amount of the hydrophobic resin particle (A) exceeds 1% by weight, the water absorption capacity is increased to possibly result in difficulty of obtaining sufficient water penetration resistance.

In the present invention, the acid group-containing amount of the hydrophobic resin particle (A) can be calculated based on the composition of monomer components (more particularly, the ratio of the acid group-containing unsaturated monomer in the entire monomer components) used for obtaining the hydrophobic resin particle (A).

The hydrophobic resin particle (A) is the one which can be dispersed in water-based medium and a resin composing the hydrophobic resin particle (A) is not particularly limited and examples of the resin are polyvinyl acetate polymers, ethylene-vinyl acetate copolymers, vinyl acetate-alkyl (meth)acrylate copolymers, alkyl (meth)acrylate copolymers, styrene-butadiene copolymers, styrene-alkyl (meth)acrylate copolymers, maleated polybutadiene polymers, polyvinyl chloride polymers, vinyl chloride-vinylidene chloride copolymers, synthetic rubber latex, polyester resins, silicon resins, acrylic silicon resins, fluoro resins, urethane resins, epoxy resins and the like. They may be used alone or two or more of them may be used together. The hydrophobic resin particle (A) may be particle with multi-structure such as core-shell type.

The above-mentioned polymer emulsifier (B) is not particularly limited if it can be dissolved in a water-based medium. Examples of it are vinyl resin, polyester resin, polyurethane resin, epoxy resin, and their modified resins. They may be used alone or two or more of them may be used together.

Examples of the vinyl resin are polymers obtained by polymerizing monomer components comprising a carbonyl group-containing radical polymerizable vinyl monomer, a carboxyl group-containing radical polymerizable vinyl monomer, and other radical polymerizable unsaturated monomer added based on the necessity.

The carbonyl group-containing unsaturated monomer may be monomers each having at least one keto or aldehyde group and at least one radical polymerizable double bond in one molecule and examples are diacetone (meth)acrylamide, acrolein, formylstyrol, (meth)acrylamidopivalic aldehyde, diacetone (meth)acrylate, acetonyl (meth)acrylate, 2-hydroxypropyl (meth) acrylate acetyl acetate, vinyl alkyl ketones and the like.

The above-mentioned carboxyl group-containing unsaturated monomer may be unsaturated compounds each having at least one carboxyl group (including dehydrated carboxyl group) and at least one radical polymerizable unsaturated group in one molecule and examples are (meth) acrylic acid, maleic anhydride, fumaric acid, itaconic acid and the like.

Above-mentioned other radical polymerizable unsaturated monomer may include radical polymerizable unsaturated monomers other than the above-exemplified monomer compounds and may be non-functional unsaturated compounds which substantially cause no reaction or interaction with carbonyl group or carboxyl group and examples are alkyl or cycloalkyl ester monomers of (meth)acrylic acid such as methyl (meth)acrylate, ethyl (meth) acrylate, propyl (meth) acrylate, n-butyl (meth) acrylate, isobutyl (meth)acrylate, tert-butyl (meth)acrylate, 2-ethylhexyl (meth)acrylate, cyclohexyl (meth)acrylate, n-octyl (meth)acrylate, lauryl (meth) acrylate, dodecyl (meth) acrylate, stearyl (meth) acrylate, 2-ethylhexyl carbitol (meth)acrylate, and isobornyl (meth) acrylate; alkoxyalkyl ester monomers of (meth)acrylic acid such as methoxybutyl (meth)acrylate, methoxyethyl (meth) acrylate, ethoxybutyl (meth) acrylate, and trimethylolpropane tripropoxy (meth)acrylate; aromatic vinyl monomers such as styrene, α-methylstyrene, and vinyltoluene; unsaturated monomers of esters of aromatic alcohols and (meth) acrylic acid such as benzyl (meth)acrylate; hydroxysilane and/or hydrolyzable silane group-containing vinyl monomers such as vinyltriethoxysilane, vinyltrimethoxysilane, vinyltris (methoxyethoxy)silane, γ-(meth)acryloyloxypropyltrimethoxysilane, 2-styrylethyltrimethoxysilane, vinyltrichlorosilane, γ-(meth)acryloyloxypropyltriacetoxysilane, γ-(meth)acryloyloxypropyltrihydroxysilane, and γ-(meth) acryloyloxypropylmethylhydroxysialne; and perfluoroalkyl (meth)acrylate such as perfluorobutylethyl (meth)acrylate, perfluoroisononylethyl (meth)acrylate, and perfluorooctylethyl (meth)acrylate. Further, amido monomers such as N-methylol acrylamide, N-methylolmethacrylamide, N-n-butoxymethylacrylamide and their derivatives, and N-n-butoxymethylmethacrylamide are also preferable examples of above-mentioned other radical polymerizable unsaturated monomer.

Examples of the above-mentioned polyester resin are resins obtained by esterification reaction or transesterification reaction of polybasic acid (compounds having 2 to 4 carboxyl groups or carboxylic acid methyl ester groups in one molecule such as phthalic acid (anhydride), isophthalic acid, terephthalic acid, maleic acid (anhydride), pyromellitic acid (anhydride), trimellitic acid (anhydride), succinic acid (anhydride), sebacic acid, azelaic acid, dodecanedicarboxylic acid, dimethyl isophthalate, and dimethyl terephthalate), polyalcohol (alcohols having 2 to 6 hydroxyl groups in one molecule such as ethylene glycol, propylene glycol, neopentyl glycol, 1,6-hexanediol, diethylene glycol, triethyleneglycol, trimethylolpropane, pentaerythritol, glycerin, tricyclodecanedimethanol, and dimethylolpropionic acid), and based on the necessity, monobasic acid (fatty acids such as castor oil fatty acids, soybean fatty acid, tall oil fatty acid, and linseed oil fatty acid, and benzoic acid) and oil and fat in a manner that carboxylic groups necessary for giving water-based property are left.

Examples of the above-mentioned polyurethane resin are reaction products of dimethylolpropionic acid with, based on the necessity, polyol (alkoxypolyalkylene glycols such as ethylene glycol, propylene glycol, methoxypolymethylene ether glycol, methoxypolyethylene ether glycol, ethoxypolyethylene ether glycol, ethoxypolybutylene ether glycol) and polyisocyanate compound (aliphatic diisocyanate such as tetramethylene diisocyanate, hexamethylene diisocyanate, trimethylhexamethylene diisocyanate, and isophorone diisocyanate; alicyclic diisocyanate such as 4,4'-methylenebis (cyclohexyl isocyanate) and isophorone diisocyanate; aromatic diisocyanate such as xylylene diisocyanate, tolylene diisocyanate, diphenylmethane diisocyanate, and polyphenylmethane diisocyanate; and their isocyanurates and biurets and the like).

Examples of the above-mentioned epoxy resin are homo radical polymers obtained by radical polymerization of epoxy group-containing radical polymerizable monomer (for example, 3,4-epoxycyclohexylmethyl (meth)acrylate and glycidyl (meth)acrylate); copolymer of the epoxy group-containing radical polymerizable monomer with other radical polymerizable monomers (for example, (meth) acrylic acid esters with alkyl or cycloalkyl having 1 to 24 carbon atoms and styrene); tri-functional alicyclic epoxy resin (for example, as commercialized products, "EpoleedGT 300" manufactured by Daicel Chem. Ind., Ltd.; and "EHPE" manufactured by Daicel Chem. Ind., Ltd.); tetra-functional alicyclic epoxy resin (for example, as commercialized products, "EpoleedGT 400" manufactured by Daicel Chem. Ind., Ltd.); and epoxy resin having at least one epoxy group in one molecule such as bisphenol type epoxy resin, novolak type epoxy resin, ε-caprolactam-modified bisphenol type epoxy resin, and polyvinylcyclohexene diepoxide modified with polycarboxylic acid resin (for example, acrylic resin and polyester resin) or polycarboxylic acid compound (for example, adipic acid, sebacic acid, and phthalic acid).

The polymer emulsifier (B) is preferably a water-soluble resin solubilized in water by an alkali. Accordingly, it is made possible to make the polymer emulsifier (B) hydrophobic by removing the alkali after film formation and the polymer emulsifier (B) can contribute not to decrease of the water penetration resistance, but to improvement of it.

Further, as it will be described in the following "Production Method of Emulsion", in consideration of the function of the polymer emulsifier (B) as an emulsifier at the time of producing the hydrophobic resin particles (A), the polymer emulsifier (B) is particularly preferable to be, among the above exemplified compounds, those obtained by polymerization of a monomer component (b) containing (meth) acrylic acid and esters since particles with small average particle diameter as described above can easily be obtained. Further, if the styrene content is high in the monomer component (b), the particle diameter of the particles in the emulsion to be obtained becomes large and consequently the water penetration resistance may possibly be decreased. Therefore, the styrene content in the monomer component (b) is preferably 50% by weight or lower, more preferably 20% by weight, or still more preferably 0 to 5% by weight.

On the other hand, in consideration of sufficient adhesion strength for the emulsion of the present invention, the polymer emulsifier (B) is particularly preferable to be carboxyl group-containing polymer among the above-exemplified compounds since high adhesion strength can easily be obtained. To make the polymer emulsifier (B) be a carboxyl group-containing polymer, a carboxyl group-containing unsaturated monomer may be used as the monomer component (b) at the time of producing the polymer emulsifier (B) and accordingly, a constituent unit derived from the carboxyl group-containing unsaturated monomer may be introduced. Preferable examples of the carboxyl group-containing unsaturated monomer are monocarboxylic acid monoethylenic unsaturated monomer such as acrylic acid, methacrylic acid, crotonic acid, and α-hydroxyacrylic acid; dicarboxylic acid monoethylenic unsaturated monomer such as maleic acid, fumaric acid, citraconic acid, aconitic acid, and itaconic acid; and among them, monocarboxylic acidmonoethylenic unsaturated monomer is more preferable because it easily cause (co)polymerization and the molecular weight control of (co) polymers is easy. Acrylic acid and methacrylic acid are still more preferable; and acrylic acid is most preferable. The content ratio of the constituent unit derived from the carboxyl group-containing unsaturated monomer in the carboxyl group-containing polymer is not particularly limited, but 10% by mole or higher in the entire constituent units of the polymer is preferable.

In the case the polymer emulsifier (B) is a carboxyl group-containing polymer, it is preferable that the 1% by mole or more of the entire carboxyl groups of the polymer is neutralized with a polyvalent metal. Accordingly, the adhesion property can be improved. The neutralization ratio (the ratio (% by mole) of the neutralized carboxyl groups to the entire carboxyl groups) is more preferably 30% by mole or higher.

Examples of the above-mentioned polyvalent metal are calcium (Ca), magnesium (Mg), aluminum (Al), silicon (Si), titanium (Ti), iron (Fe), copper (Cu), zinc (Zn), and zirconium (Zr). Among them, calcium and/or magnesium is particularly preferable. When the above-mentioned carboxyl groups are neutralized with calcium and/or magnesium, coating can substantially be made completely insoluble by calcium ion or the like supplied from the substrate side such as concrete and inorganic construction materials and improve the water penetration resistance is improved. And at the same time the coating with high strength (hardness) can be obtained and the composition once impregnated with the substrate can firmly fixed to exhibit remarkably excellent adhesion property (impregnating adhesion property).

In the case the polymer emulsifier (B) is a carboxyl group-containing polymer, the carboxyl group-containing polymer may be neutralized with compounds other than the above-mentioned polyvalent metals and may be neutralized (in about 0.5 to 1.5 neutralization equivalent) with basic compounds, for example, ammonia; primary amine such as, ethylamine, propylamine, butylamine, benzylamine, monoethanolamine, neopentanolamine, 2-aminopropanol, and 3-aminopropanol, 2-amino-2-methyl-1-propanol; secondary amine such as diethylamine, diethanolamine, di-n- or di-isopropanolamine, N-methylethanolamine, and N-ethylethanolamine; tertiary amine such as dimethylethanolamine, trimethylamine, triethylamine, triisopropylamine, methyldiethanolamine, and dimethylaminoethanol; and inorganic hydroxides such as lithium hydroxide, sodium hydroxide and potassium hydroxide.

The weight average molecular weight of the polymer emulsifier (B) is preferably 1,000 to 100,000, more preferably 5,000 to 50,000, and still more preferably 5,000 to 30,000. If the weight average molecular weight of the polymer emulsifier (B) is lower than 1,000, the coating strength may possibly be decreased and on the other hand, if it exceeds 100,000, the viscosity is increased, handle of the polymer emulsifier (B)

may possibly become difficult, and uniform application may become impossible. Further, in the case the weight average molecular weight of the polymer emulsifier (B) is 100,000 or lower, the polymer emulsifier (B) easily penetrates the substrate to result in improvement of the adhesion property and the water penetration resistance improves because an even coating is obtained.

Also, as it will be described in the following "Production Method of Emulsion", in consideration of the function of the polymer emulsifier (B) as an emulsifier at the time of producing the hydrophobic resin particle (A), the weight average molecular weight of the polymer emulsifier (B) is particularly preferably in a range of 6,000 to 50,000, since particles with small average particle diameter can easily be obtained as described above. If the weight average molecular weight of the polymer emulsifier (B) is lower than 6,000, the particle diameter of particles in the emulsion to be obtained becomes large and accordingly, the water penetration resistance may possibly be decreased. On the other hand, if it exceeds 50,000, the particle diameter of particles in the emulsion to be obtained also becomes large and accordingly, the water penetration resistance may possibly be decreased and at the same time the impregnating adhesion property tends to be decreased owing to viscosity increase.

The glass transition temperature of the polymer emulsifier (B) is not particularly limited, however 20° C. or higher is preferable. More preferably, it is 40° C. or higher. If the glass transition temperature of the polymer emulsifier (B) is lower than 20° C., the coating strength becomes weak and the adhesion property may possibly be decreased. The glass transition temperature (Tg (° C.)) of the polymer emulsifier (B) can be calculated from the monomer components used for obtaining the polymer emulsion according to the above-mentioned equations (1) and (2) similarly to the case of the glass transition temperature of the hydrophobic resin particle (A).

The first and the second emulsions of the present invention are preferable to also contain pigment. By containing pigment, coating having high blocking resistance, sealing property, and coating with excellent design can be formed. Examples of the pigment are, as organic pigment, azo-chelate pigments, insoluble azo pigments, condensed azo pigments, phthalocyanine pigments, indigo pigments, perinone pigments, perylene pigments, dioxane pigments, quinacridone pigments, isoindolinone pigments, and metal complex pigments, and as inorganic pigment, coloring pigment such as chrome yellow, yellow iron oxide, red iron oxide, carbon black, and titanium dioxide and extender pigment such as talc, clay, barium sulfate, and calcium carbonate. They may be used alone or two or more of them may be used together.

In the case the first and the second emulsions of the present invention also contain a pigment, the content is preferably 10 to 1,000 parts by weight relative to 100 parts by weight of the resin components [solid matter of the hydrophobic resin particle (A)+polymer emulsifier (B)].

The first and the second emulsions of the present invention may, based on the necessity, further contain a variety of additives such as a surface adjustment agent, a thickener, a dispersant, an antioxidant, a UV protection agent, a defoaming agent and an organic solvent to the extent that the effects of the present invention are not deteriorated in terms of the storage stability and workability.

The first and the second emulsions of the present invention can be produced easily by the production method of an emulsion of the present invention, which will be described later, however the production method is not particularly limited to this and, the emulsions of the present invention can also be obtained by, for example, synthesizing the hydrophobic resin particle (A) and the polymer emulsifier (B) respectively and mixing them with other components, based on the necessity.

The first and the second emulsions of the present invention can be used for various purposes such as a detergent builder, a scale prevention agent, a chelating agent, a cement water-reducing agent, a film formed product, a pulp formed product, a seat formed product, a material for ink, a material for laminates, a water-based coating material and a water-based sealer for top coating or intermediate coating (for example, for vehicles, plastic molded products, domestic electric appliances, steel products, large scale structures, aircrafts, construction materials, interior of building, exterior of building, tiles, concrete, and wood). And particularly it is preferable to use the emulsions as water-based sealers since various properties such as the impregnating adhesion property and the water penetration resistance, which are the effects of the present invention, will be exhibited sufficiently. In the case the emulsions are used as water-based sealers, object to be coated is not particularly limited and the emulsions can be applied to, for example, inorganic ceramic construction materials (for example, inorganic construction materials and tiles to be cured by autoclave aging or steam aging), paper, metals such as iron and aluminum, wood, slates, concrete, bricks, and asbestos substrates.

[Production Method of Emulsion]

In a production method of an emulsion of the present invention, the particles with an average particle diameter of 50 nm or smaller are produced by polymerization of monomer component (a) for forming the hydrophobic resin particle (A), which is described in previous paragraph [Emulsion], in an aqueous solution (B') of the polymer emulsifier (B), which is described in previous paragraph [Emulsion], by using a water-soluble initiator. With conventional techniques, in the case of obtaining an emulsion of particles so small as to have an average particle diameter of 50 nm or smaller, a technique of increasing a surfactant has generally been employed, however the emulsion obtained by increasing the surfactant becomes inferior in the water penetration resistance. In a production method of an emulsion of the present invention, the above-mentioned polymer emulsifier (B) is utilized as an emulsifier and the monomer component (a) is polymerized in the aqueous solution (B') of the polymer emulsifier (B) to easily obtain the above-mentioned emulsion of the present invention without deteriorating the water penetration resistance. If the polymerization is carried out in the aqueous solution (B') of the polymer emulsifier (B) for forming the hydrophobic resin particle (A), the emulsion of the present invention can easily be obtained in a single pot. That is, as compared with process of separately synthesizing the hydrophobic resin particles (A) and the polymer emulsifier (B) and mixing them, the method is advantageous in a point that a mixing step is not necessary and thus the process can be simplified.

The aqueous solution (B') of the polymer emulsifier (B) may be any solution if it is a solution obtained by dissolving the polymer emulsifier (B) described in the previous paragraph [Emulsion] in water or a water-based medium containing an organic solvent or the like based on the necessity. The concentration of the polymer emulsifier (B) in the aqueous solution (B') is not particularly limited, however it is preferable, for example, to control around 30% by weight. It is particularly preferable to use, as the polymer emulsifier (B), water-soluble resin solubilized in water by an alkali is used (B) because of the reason same as described in the previous paragraph [Emulsion].

The aqueous solution (B') of the polymer emulsifier (B) is preferably obtained by emulsion polymerization of a monomer component (b) containing (meth) acrylic acid and esters followed by solubilization of the reaction product with an alkali. Use of the aqueous solution (B') obtained by emulsion polymerization of such specified monomer component (b) makes it easy to obtain small particles having an average particle diameter as described above. Further, if the content of styrene is high in the monomer component (b), the diameter of the particles in the emulsion to be obtained may possibly become large and consequently the water penetration resistance may possibly be decreased and therefore the content of styrene in the monomer components (b) is preferably 50% by weight or lower, more preferably 20% by weight or lower, and still more preferably 0 to 5% by weight. If the polymer emulsifier (B) is obtained by emulsion polymerization of the above-mentioned monomer component (b) followed by solubilization of the reaction product with an alkali, it becomes possible to carry out polymerization for successively forming the hydrophobic resin particle (A) and the emulsion of the present invention can easily be obtained in a single pot. For example, in comparison with the case of obtaining the polymer emulsifier (B) by solution polymerization, the step of removing the solvent is not necessary and the process can be simplified to result in remarkable improvement of the productivity.

The above-mentioned monomer component (a) is not particularly limited and examples are preferable to be selected properly from the following compounds.

Alkyl or cycloalkyl ester monomer of (meth) acrylic acid such as methyl (meth)acrylate, ethyl (meth)acrylate, propyl (meth)acrylate, n-butyl(meth)acrylate, isobutyl (meth) acrylate, t-butyl (meth) acrylate, 2-ethylhexyl (meth)acrylate, cyclohexyl (meth)acrylate, n-octyl (meth)acrylate, lauryl (meth)acrylate, dodecyl (meth)acrylate, stearyl (meth)acrylate, 2-ethylhexylcarbitol (meth)acrylate, isobornyl (meth) acrylate; alkoxy alkyl ester monomer of (meth)acrylic acid such as methoxybutyl (meth)acrylate, methoxyethyl (meth) acrylate, ethoxybutyl (meth)acrylate and trimethylolpropanetripropoxy (meth)acrylate; unsaturated aromatic vinyl monomer such as styrene, α-methylstyrene and vinyltoluene; unsaturated monomer such as ester of aromatic alcohol such as benzyl (meth)acrylate and (meth) acrylic acid; hydroxy silane and/or hydrolyzable silane group containing vinyl monomer such as vinyl triethoxysilane, vinyl trimethoxysilane, vinyl tris(methoxyethoxy)silane, γ-(meth)acryloyloxypropyl trimethoxysilane, 2-stylylethyl trimethoxysilane, vinyl trichlorosilane, γ-(meth) acryloyloxypropyl triacetoxysilane, γ-(meth)acryloyloxypropyl trihydroxysilane, γ-(meth)acryloyloxypropyl methylhydroxysilane; perfluoroalkyl(meth)acrylate such as perfluorobutylethyl (meth)acrylate, perfluoroisononylethyl (meth)acrylate, perfluorooctylethyl (meth)acrylate; amide monomer or derivatives thereof such as N-methylol acrylamide, N-methylol methacrylamide, N-n-butoxymethyl acrylamide, N-n-butoxymethyl methacrylamide.

Particularly, as the monomer component (a), it is preferable to use a monomer with which the content of the acid group-containing unsaturated monomer is 1% by weight or lower, more preferably 0.8% by weight or lower and the glass transition temperature of the hydrophobic resin particle (A) obtained by the polymerization is −70 to 30° C., preferably −60 to 20° C., because of the reason same as described in the paragraph [Emulsion]. In the production method of the emulsion of the present invention, it is important to adjust the solid matter ratio (weight ratio) of the aqueous solution (B') and the monomer component (a) to satisfy [monomer component (a)]/[aqueous solution (B')]=40/60 to 80/20. The ratio of [monomer component (a)]/[aqueous solution (B')] is preferably 45/55 to 80/20. The ratio of [monomer component (a)]/[aqueous solution (B')] is more preferably 50/50 to 80/20, and the [monomer component (a)]/[aqueous solution (B')] is still more preferably 55/45 to 80/20. Accordingly, the emulsion of the present invention which exhibits the above-mentioned effects can be obtained. If the ratio of the aqueous solution (B') is lower than the above-mentioned range, the polymerization stability is also worsened.

At the time of polymerizing the monomer component (a) in the aqueous solution (B'), the monomer component (a) may be added to the aqueous solution (B') and an addition method of the monomer component (a) is not particularly limited.

As the above-mentioned water-soluble initiator, for example, sodium persulfate, potassium persulfate, ammonium persulfate, and hydrogen peroxide may be used. They may be used alone or two or more of them may be used in combination.

The amount of the water-soluble initiator to be used is not particularly limited, however it is preferable to be 0.05 to 5% by weight to the monomer component (a). If the used amount of the water-soluble initiator is too much, the water penetration resistance may possibly be deteriorated and on the other hand, if it is too little, the polymerization degree tends to be decreased. The water-soluble initiator may be added previously to the aqueous solution (B') or may be added to the aqueous solution (B') together with the monomer component (a) by dropwise and the like.

The conditions of the above-mentioned polymerization may properly be set depending on the composition of the monomer component (a) and the like, but the reaction temperature is preferably 60 to 90° C. and the reaction time is preferably 2 to 5 hours. Other than the polymer emulsifier, an emulsifier, a chain transfer agent, a reducing agent, and the like which are commonly used for polymerization may be used in the polymerization.

[Structure Body]

A structure body of the present invention is structure body comprising a porous substrate and a coating formed on the surface of the substrate, wherein the coating is formed using the emulsion of the present invention. That is, the structure body of the present invention is obtained by forming the coating on the surface of the substrate using the emulsion of the present invention as a water-based sealer.

As the porous substrate, inorganic porous substrate (for example, material used for construction material, structural material, civil engineering material and industrial material such as calcium silicate plate, asbestos-cement plate, wood-cement plate, pulp-cement plate, lightweight foamed concrete plate) mainly containing inorganic material such as cement, calcium silicate, and gypsum, and old (deteriorated) coating wall can be exemplified.

At the time of forming the coating on the surface of the above-mentioned porous substrate by using the emulsion of the present invention, the emulsion (the water-based sealer) of the invention is preferably used with a solid matter concentration of 10 to 50% by weight, more preferably 20 to 40% by weight. If the solid matter concentration is lower than 10% by weight, the number of the application times is increased for obtaining a enough coating thickness and result in decrease of coating efficiency and on the other hand, if it exceeds 40% by weight, the penetrating property in the substrate is deteriorated and sufficient impregnating adhesion property may not be exhibited. The emulsion of the present invention, which has high water penetrating resistance and high adhesion property, can be used as intermediate paint (second sealer) coated on the sealer coating which is obtained after the sealer is coated on the substrate. In this case, because high impregnating property is not necessary and on the other hand, drying property is required, the solid matter content is preferably 25 to 60% by weight, more preferably 30 to 55% by weight. And in this case, it is preferable that the emulsion is used with pigment.

At the time of forming a coating on the surface of the porous substrate by using the emulsion (the water-based sealer) of the present invention, the application amount (dry) of the water-based sealer is not particularly limited, however it is preferably 1 to 100 g/m$^2$ and more preferably 5 to 80 g/m$^2$.

The coating method in the case of forming a coating on the surface of the porous substrate by using the emulsion (the water-based sealer) of the present invention is not particularly limited and conventionally known coating methods such as roller, brush, spray, roll coater, immersion, and flow coater (curtain flow coater, etc.) may be employed.

At the time of forming a coating on the surface of the porous substrate by using the emulsion (the water-based sealer) of the forming a coating on the surface of the porous substrate by using the emulsion (the water-based sealer) of the present invention, the drying conditions after the application of the water-based sealer are not particularly limited and may properly be set and heat drying is preferably carried out at 70 to 120° C. for 1 to 30 minutes in case the coating is used for construction material, and preferably carried out at room temperature (standard condition based on JIS K 5000-1-6) for more than 1 hour in case the coating is used for interior and exterior building material.

The emulsion according to the present invention is useful for a detergent builder, a scale prevention agent, a chelating agent, a cement water-reducing agent, a film formed product, a pulp formed product, a seat formed product, a material for ink, a material for laminate, a water-based paint and a water-based sealer for top coating or intermediate coating (for example, for automobile, plastic molded product, domestic electric appliance, steel product, large scale construction, aircraft, construction material, interior and exterior building materials, tile, concrete, and wood), and particularly preferably used as a water-based sealer for tile, concrete, and inorganic construction material.

BEST MODES FOR CARRING OUT THE INVENTION

Hereinafter, the present invention will be described more in details with reference to the Examples. However, the present invention is not limited to these Examples. Hereinafter, "part by weight" and "% by weight" will be simplified as "part" and "%", respectively, unless otherwise specified.

Measurement of the weight average molecular weight (Mw) in the respective production examples was carried out by analyzing obtained aqueous solutions of polymer emulsifier by GPC (gel permeation chromatography). The apparatus and the measurement conditions employed were as follows.

GPC column: "GF-7 MHQ" manufactured by Showa Denko K.K.;
Mobile phase: an aqueous solution obtained by adding pure water to 34.5 g of disodium hydrogen phosphate dodecahydrate and 46.2 g of sodium dihydrogen phosphate dihydrate (both extrapure grade reagents) to be 5000 g in total and filtering the solution with a membrane filter with 0.45 μm mesh;
Detector: "481 Model" manufactured by Waters;
Detection wavelength: UV 214 nm;
Pump: "L-7110" manufactured by Hitachi Ltd.
Flow rate: 0.5 mL/min;
Temperature: 35° C.; and
Calibration curve: made by using standardized sample of sodium polyacrylate (manufactured by Sowa Kagaku Co., Ltd.).

The weight average molecular weight (Mw) of each of the resin components of the respective Examples and Comparative Examples was measured by using a sample in form of a 0.2% solution obtained by drying each of the obtained emulsions and dissolving dried emulsions in THF, and subjecting the sample to GPC (gel permeation chromatography). The apparatus and the measurement conditions used were as follows.

GPC main body: "HLL-8120 GPC" manufactured by Tosoh Corporation;
GPC columns: "TSK-GEL G 5000 HXL" and "GMHXL-L" column bonded to each other, manufactured by Tosoh Corporation;
Mobile phase: tetrahydrofuran; and
Calibration curve: made by using standardized sample of polystyrene The average particle diameter (nm) of particles in each emulsion of the respective Examples and Comparative Examples was measured by using VOLUME Weighted GAUSSIAN DISTRIBUTION Analysis (Solid Particle) as an analysis method and using "NICOMP MODEL 880 (Windows (Registered Trademark), based Software)" manufactured by Particle Sizing Systems Inc. as an apparatus.

PRODUCTION EXAMPLE 1

240 g of Isopropyl alcohol as a solvent was charged into a four-neck flask equipped with a stirrer, a thermometer, a cooling tube, and a nitrogen gas inlet tube and heated to 85° C. and then while nitrogen gas being introduced, a mixture containing 160 g of monomer component having a composition of 13 parts of methacrylic acid, 63 parts of methyl methacrylate, and 24 parts of 2-ethylhexyl acrylate, and 6.4 g of a reaction initiator ("ABN-E" manufactured by Japan Hydrazine Co., Ltd.) was dropwise added for 2 hours. After the dropwise was completed, the same temperature was kept and polymerization was carried out for 2 hours. After that, the solvent was removed by distillation in reduced pressure to obtain a water-soluble resin with a glass transition temperature of 50° C.

Then, the obtained water-soluble resin 160 g was crushed and added to 240 g of water in which ammonia in an amount equivalent to the amount of the carboxyl groups contained in the water-soluble resin (calculated from the composition of the monomer component used) was dissolved and mixed with stirring. The resin added water was heated and the water-soluble resin in the water was dissolved therein at 80° C. to obtain an aqueous solution (1) of a polymer emulsifier with a solid matter concentration 40%. The weight average molecular weight (Mw) of the polymer emulsifier in the aqueous solution (1) was 10,000.

PRODUCTION EXAMPLE 2

A water-soluble resin with a glass transition temperature of 70° C. was obtained in the same manner as Production Example 1, except that 160 g of monomer components with a composition of 35 parts of acrylic acid, 53 parts of styrene, and 12 parts of 2-ethylhexyl acrylate was used as monomer components.

Then, the obtained water-soluble resin 160 g was crushed and added to 240 g of water in which ammonia in an amount equivalent to the amount of the carboxyl groups contained in the water-soluble resin (calculated from the composition of the monomer component used) was dissolved and mixed with stirring. The resin added water was heated and the water-soluble resin in the water was dissolved therein at 80° C. to obtain an aqueous solution (2) of a polymer emulsifier with a solid matter concentration 40%. The weight average molecular weight (Mw) of the polymer emulsifier in the aqueous solution (2) was 10,000.

PRODUCTION EXAMPLE 3

2800 g of Ion-exchanged water was charged into a separable flask having a capacity of 5L and made by SUS 316 and equipped with a reflux condenser and a stirrer and heated to 100° C. with stirring. Then 630 g (acrylic acid 7 mole) of an aqueous 80% acrylic acid solution (hereinafter, referred to as "80% AA") and 186.7 g (ammonium persulfate 4 g to acrylic acid 1 mole) of an aqueous 15% ammonium persulfate solution (hereinafter, referred to as "15% APS") were added dropwise separately from different dropping ports. In this dropwise, the starting of the dropwise addition was controlled to be same and respective dropwise addition time is controlled to be 180 minutes for 80% AA and 185 minutes for 15% APS, and during the dropwise addition, heating was continued so as to maintain the refluxing state. After that, the refluxing state was kept to complete the polymerization for 30 minutes after completion of the dropwise addition of 80% AA. And then the reaction solution was cooled to a room temperature. Successively, the pressure was reduced to 200 mmHg by a vacuum pump and the reaction solution was concentrated at about 65° C. for about 90 minutes to remove a prescribed amount of water and obtain an aqueous polymer solution with a solid matter concentration 40%.

Next, 246 g of ion-exchanged water was added to 1040 g of the obtained aqueous polymer solution and under stirring condition, 196 g of 25% ammonia water was dropwise added for 15 minutes at a room temperature. And successively, 107 g of a calcium hydroxide powder was added for 30 minutes and the resulting mixture was stirred for 90 minutes to obtain an aqueous solution (3) of a polymer emulsifier with a solid matter concentration 30% (polyacrylic acid of which 50% by mole of the entire carboxyl groups were neutralized with calcium and 50% by mole were neutralized with a ammonia). The weight average molecular weight (Mw) of the polymer emulsifier in the aqueous solution (3) was 12,000.

EXAMPLE 1

400 g of the aqueous solution (1) of the polymer emulsifier and 150 g of water were charged into a four-neck flask equipped with a stirrer, a thermometer, a cooling tube, and a nitrogen gas inlet tube. While being kept at 80 to 85° C. and nitrogen gas being introduced, 240 g of the monomer components with a composition A in Table 1 and 100 g of an aqueous 1% ammonium persulfate solution were dropwise added separately for 2 hours through respectively separate dropping ports. After the dropwise addition was completed, the temperature was kept same and emulsion polymerization was carried out for 2 hours to obtain an emulsion with a solid matter concentration of 45% at a solid matter ratio of (hydrophobic resin particles)/(polymer emulsifier) (weight ratio) =60/40. The weight average molecular weight (Mw) of the resin component of the obtained emulsion and the average particle diameter (nm) of the particles in the emulsion are shown in Table 2. Table 1 also shows the glass transition temperature of hydrophobic resin particles formed by polymerization of the monomer components with the respective compositions which is obtained by calculation from the respective monomer components.

Next, the obtained emulsion was diluted with water to adjust the solid matter concentration to be 30% and applied to a calcium silicate plate ("Hilac 0.8 lightweight calcium silicate" manufactured by A & A Material; JIS-A5403, abbreviated as Ca—Si plate in the Table) previously heated at 55° C. by air spraying so that the coating amount applied becomes 100 g/m² (wet) and dried at 120° C. for 5 minutes to obtain a structure body. The impregnating adhesion property, water penetration resistance, warm water resistance, frost damage resistance, moisture penetration resistance, mud crack resistance and blocking resistance of the obtained structure body were evaluated by the following methods. The results are shown in Table 2.

<Impregnating Adhesion Property>

A coated face of a test sample (the obtained structure body) was cut in 36 squares at 2 mm intervals in lattice-like manner by a cutter knife and a cloth type adhesive tape ("No. 916" manufactured by Kikusui Tape Co., Ltd.) was attached to the coated face and the cloth type adhesive tape was rubbed with an eraser by reciprocating the eraser 20 times to pressure bond the tape on the coated face and then the cloth type adhesive tape was peeled vertically at once after 1 minute from the adhesion to observe and evaluate the detachment of the coating according to the following standards.

◯: 0 to 6 squares were detached:

Δ: 7 to 12 squares were detached: and

X: 13 or more squares were detached.

<Water Penetration Resistance>

Evaluation was carried out according to Water Penetration Test B method described in JIS-A6909. Practically, a test sample (the obtained structure body) was kept horizontal and a water penetration testing tool comprising an Erlenmeyer funnel of 75 mm aperture diameter and a messpipet with 5 mL capacity connected to the tip end of the funnel with a rubber tube was attached to and fixed on the coating of the test sample by using the epoxy resin sealing agent with the funnel side of the tool being kept downward and they were left still for 24 hours or longer in such a condition. After that, water at 20° C. was poured so that height of water becomes 250 mm above the coating surface of the test sample and the water penetration amount (cc) was calculated from the difference between the height of water immediately after water supply and the height of water 24 hours after. Water penetration resistance was evaluated based on the following standards.

◎: water penetration amount was less than 1 cc

◯: water penetration amount was not less than 1 and less than 2 cc:

Δ: water penetration amount was not less than 2 and less than 4 cc: and

X: water penetration amount was not less than 4 cc.

<Warm Water Resistance>

A coated face of a test sample (the obtained structure body) was cut in 36 squares at 2 mm intervals in lattice-like manner by a cutter knife and obtained test sample was immersed in 50° C. of warm water for 7 days. After that, warm water resistance was evaluated in the same manner as impregnating adhesion property and at the same time, existence of defect of coatings such as fructure, peeling, swelling of the coating was observed.

○: 0 to 6 squares were detached but defect of coating was not observed.

Δ: 7 to 12 squares were detached but defect of coating was not observed.

X: 13 or more squares were detached and fructure, peeling, or swelling of the coating was observed.

<Frost Damage Resistance>

A coated face of a test sample (the obtained structure body) was cut in 36 squares at 2 mm intervals in lattice-like manner by a cutter knife. Obtained test sample was immersed in 20° C. of water for 2 hours and was frozen under −20° C. atmosphere for 2 hours. This immerse in water and freezing under −20° C. atmosphere was made 1 cycle and 200 cycle test was carried out. After that, evaluation was carried out in the same manner as impregnating adhesion property and at the same time, existence of defect of coatings such as fructure, peeling, swelling of the coating was observed.

○: 0 to 6 squares were detached but defect of coating was not observed.

Δ: 7 to 12 squares were detached but defect of coating was not observed.

X: 13 or more squares were detached and fructure, peeling, or swelling of the coating was observed.

<Moisture Penetration Resistance>

A test sample was obtained in the same manner as Example 1, except that emulsion was applied so that the coating amount applied becomes 150 g/m$^2$ (wet). Moisture penetration test of ASTM E96 B method was carried out to the test sample.

○: Less than 20 g/m$^2$ 24 hours

Δ: 20 to 70 g/m$^2$ 24 hours

X: More than 70 g/m$^2$ 24 hours

<Mud Crack Resistance>

Mud crack of a coating of the obtained test sample was carried out by visual observation.

○: Mud crack was not observed at all

X: Mud crack was observed in whole part

<Blocking Resistance>

Obtained test sample and non-coated state plate was adjusted to 50° C. Then, put a gauze between them and pressure of 2 kg/cm$^2$ was loaded for 30 minutes with maintaining 50° C. by using the heat press.

After cooling to the room temperature, gauze was peeled slowly and peeling resistance and trace of gauze on the coating was observed by visual observation and was evaluated.

◎: gauze fell by itself and trace of gauze remained little on the coating.

○: gauze dose not fell by itself but trace of gauze remained little on the coating.

X: A part of the coating was detached when gauze was peeled and trace of the gauze remains on the coating.

EXAMPLE 2

An emulsion with a solid matter concentration 45% at a solid matter ratio of (hydrophobic resin particles)/(polymer emulsifier) (weight ratio)=60/40 was obtained in the same manner as Example 1, except that 240 g of the monomer components with the composition B in Table 1 were used. The weight average molecular weight (Mw) of the resin component of the obtained emulsion and the average particle diameter (nm) of the particles in the emulsion are shown in Table 2.

Then, using the obtained emulsion, a structure body was obtained in the same manner as Example 1. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

EXAMPLE 3

353.8 g of Ion-exchanged water and the entire amount of an aqueous solution of emulsifier obtained by dissolving 3.1 g of an emulsifier ("Hitenol 18 E" manufactured by Dai-Ichi Kogyo Seiyaku Co., Ltd.) in 12.4 g of ion-exchanged water were charged into a four-neck flask equipped with a stirrer, a thermometer, a cooling tube, and a nitrogen gas inlet tube and while nitrogen gas being introduced, the contents were heated to 72° C. Then, 10% of total amount of a monomer mixture containing 23.6 g of methacrylic acid, 110. 3 g of methyl methacrylate, 15.8 g of 2-ethylhexyl acrylate, and 7.9 g of 2-ethylhexyl thioglycolate, and 22.1 g of an aqueous 5% ammonium persulfate were added. 15 minutes after the addition, the remaining part of the monomer mixture (90% of the total amount) was dropwise added for 90 minutes. 10 minutes after the completion of the dropwise addition, the mixture was heated to 75° C. and 25% ammonia water was added to obtain an aqueous solution of a polymer emulsifier (4). The weight average molecular weight (Mw) of the polymer emulsifier in the aqueous solution was 10,000.

Successively, the temperature was adjusted to 78° C. and 236.3 g of the monomer components with the composition A in Table 1 was dropwise added for 90 minutes. In this procedure, according to increase of the resin viscosity, ion-exchanged water for resin viscosity adjustment was added for dilution. Further, 15 minutes after the completion of the dropwise addition, 11.9 g of an aqueous 2% ammonium persulfate solution was dropwise added for 30 minutes. After that, the reaction product was kept same temperature for 120 minutes for maturation to obtain an emulsion with a solid matter concentration of 40% at a solid matter ratio of (hydrophobic resin particles)/(polymer emulsifier) (weight ratio)=60/40. The weight average molecular weight (Mw) of the resin component of the obtained emulsion and the average particle diameter (nm) of the particles of the emulsion are shown in Table 2.

In the same manner as Example 1, a structure body was obtained using the obtained emulsion. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

EXAMPLE 4

7% each of butyl cellosolve and texanol relative to the entire solid matter was added to emulsion obtained in Example 3 while stirring. The next day, the emulsion was diluted with water to adjust the solid matter concentration to be 30%. Then, 11.9 g of an aqueous 2% ammonium persulfate solution was dropwise added for 30 minutes. After that, the reaction product was kept same temperature for 120 minutes for maturation to obtain an emulsion with a solid matter concentration of 40% at a solid matter ratio of (hydrophobic resin particles)/(polymer emulsifier) (weight ratio)=60/40. The weight average molecular weight (Mw) of the resin component of the obtained emulsion and the average particle diameter (nm) of the particles of the emulsion are shown in Table 2.

In the same manner as Example 1, a structure body was obtained using the obtained emulsion. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

EXAMPLE 5

The emulsion obtained by Example 3 and the emulsion for mixing which is mentioned below were mixed so that solid matter ratio of them becomes 1:1, and 7% each of butyl cellosolve and texanol relative to the entire solid matter was added to emulsion mixture while stirring. The next day, the emulsion was diluted with water to adjust the solid matter concentration to be 30%. Then, the emulsion was applied to a calcium silicate plate at room temperature with brush so that the coating amount applied becomes 100 g/m$^2$ (wet) and dried at room temperature for 2 hours to obtain a structure body. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

[Production of Emulsion for Mixing]

76.8 g of deionized water was charged into a flask equipped with a dropwise funnel, a stirrer, a nitrogen gas inlet tube, a thermometer and a reflux condenser.

Pre-emulsion of first step containing 4.0 g of 25% aqueous solution of AQUARON HS-10, 4.0 g of 25% aqueous solution of AQUARON RN-20, 5.8 g of deionized water, 14.0 g of methyl methacrylate, 7.0 g of n-butyl methacrylate, 8.0 g of cyclohexyl methacrylate and 1.0 g of acrylic acid was prepared in the dropwise funnel. Then, 7.3 g, which corresponds to 5% of total monomer amount, of the pre-emulsion was added to the flask. While nitrogen gas being introduced slowly, the contents were heated to 75° C. with stirring.

After heated to 75° C., 6.0 g of 5% potassium persulfate was added and polymerization started. At this time, reaction system was heated to 80° C. and the temperature was maintained for 10 minutes. The procedure so far was defied as initial reaction.

After the initial reaction, prepared pre-emulsion for first step was added dropwise uniformly for 50 minutes with maintaining the temperature of reaction system to 80° C. After the dropwise addition, dropwise funnel was washed with 5 g of deionized water and the deionized water used for washing was added to the flask. The same temperature was maintained for 30 more minutes and first step polymerization was completed.

Next, 0.9 g of 25% ammonia water was added and stirred for 10 minutes with maintaining the same temperature. Succesively, pre-emulsion of second step containing 2.0 g of 25% aqueous solution of AQUARON HS-10, 2.0 g of 25% aqueous solution of AQUARON RN-20, 23.2 g of deionized water, 36.0 g of 2-ehylhexylacrylate, 12.0 g of cyclohexyl methacrylate, 20.0 g of n-butyl methacrylate, 1.0 g of γ-methacryloxypropyl trimethoxysiran, 1.0 g of 1, 2, 2, 6, 6-pentamethylpiperidinyl methacrylate was added dropwise uniformly to the flask for 130 minutes. After the dropwise addition, dropwise funnel was washed with 5 g of deionized water and the deionized water used for washing was added to the flask. The same temperature was maintained for 1 more hour and emulsion for mixing was obtained.

EXAMPLE 6

An emulsion with a solid matter concentration of 45% at a solid matter ratio of (hydrophobic resin particles)/(polymer emulsifier) (weight ratio)=80/20 was obtained in the same manner as Example 1, except that the charging amount of the aqueous solution (1) of the polymer emulsifier was changed to 200 g, the charging amount of water was changed to 140 g, the amount of the monomer components (composition A) was changed to 320 g, and the amount of the aqueous 1% ammonium persulfate solution was changed to 133 g. The weight average molecular weight (Mw) of the resin component of the obtained emulsion and the average particle diameter (nm) of the particles of the emulsion are shown in Table 2.

Next, in the same manner as Example 1, a structure body was obtained using the obtained emulsion. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

EXAMPLE 7

A structure body was obtained, in the same manner as Example 1, using the emulsion obtained in the same manner as Example 1, except that a slate plate ("Nozawa Flexible Sheet": JIS-A5403 manufactured by Nozawa Co, abbreviated as slate plate in Table) was used instead of using the calcium silicate plate. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

EXAMPLE 8

An emulsion with a solid matter concentration of 45% at a solid matter ratio of (hydrophobic resin particles)/(polymer emulsifier) (weight ratio)=60/40 was obtained in the same manner as Example 1, except that 533 g of the aqueous solution (3) of the polymer emulsifier was used as the aqueous solution of the polymer emulsifier and the charging amount of water was changed to 17 g. The weight average molecular weight (Mw) of the resin component of the obtained emulsion and the average particle diameter (nm) of the particles of the emulsion are shown in Table 2.

Next, in the same manner as Example 1, a structure body was obtained using the obtained emulsion. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

EXAMPLE 9

An emulsion with a solid matter concentration of 45% at a solid matter ratio of (hydrophobic resin particles)/(polymer emulsifier) (weight ratio)=55/45 was obtained in the same manner as Example 1, except that the charging amount of the aqueous solution (1) of the polymer emulsifier was changed to 450 g, the charging amount of water was changed to 129 g, the amount of the monomer components (composition A) was changed to 220 g, and the amount of the aqueous 1% ammonium persulfate solution was changed to 90 g. The weight average molecular weight (Mw) of the resin component of the obtained emulsion and the average particle diameter (nm) of the particles of the emulsion are shown in Table 2.

Next, the following components were added and mixed to 133 g of the emulsion (I) to obtain an emulsion (II) containing pigments.

Ion-exchanged water: 52.3 g
Dispersant ("Demol EP" manufactured by Kao Corp.): 20.0 g
Defoamin agent ("Nopco 8034" manufactured by San Nopco Ltd.): 0.3 g
Titanium oxide ("R-780" manufactured by Ishihara Sangyo Kaisha, Ltd.): 30.0 g
Calcium carbonate ("NS-100" manufactured by Nitto Funka Kogyo K.K.): 15 g
Kaolin ("AA Kaolin" manufactured by Sanyo Clay Co., Ltd.): 15 g and
Thickener (a 5% aqueous solution of "Adekanol UH420" manufactured by Asahi Denka Kogyo K.K.): 1.0 g.

Next, the obtained pigment-containing emulsion (II) was diluted with water to adjust the solid matter concentration 30% and applied to a calcium silicate plate ("Hilac 0.8 lightweight calcium silicate" manufactured by A & A Material; JIS-A5403, abbreviated as Ca—Si plate in the Table) previously heated at 55° C. by air spraying so that the coating amount applied becomes 100 g/m²(wet) and dried at 120° C. for 5 minutes to obtain a structure body. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

EXAMPLE 10

The pigment-containing emulsion (II) obtained in Example 0.9 was diluted with water to adjust the solid matter concentration 30% and applied to a calcium silicate plate ("Hilac 0.8 lightweight calcium silicate" manufactured by A & A Material; JIS-A5403, abbreviated as Ca—Si plate in the Table) previously heated at 55° C. by air spraying so that the coating amount applied becomes 100 g/m² (wet) and dried at 120° C. for 5 minutes. Then, pigment-containing emulsion (II) was applied by air spraying so that the coating amount applied becomes 100 g/m² (wet) and dried at 120° C. for 5 minutes again to obtain a structure body. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

EXAMPLE 11

An emulsion with a solid matter concentration of 45% at a solid matter ratio of (hydrophobic resin particles)/(polymer emulsifier) (weight ratio)=60/40 was obtained in the same manner as Example 1, except that 240 g of the monomer components with the composition C in Table 1 were used as the monomer components and 100 g of an aqueous 3% ammonium persulfate solution was used instead of using 100 g of the aqueous 1% ammonium persulfate solution. The weight average molecular weight (Mw) of the resin component of the obtained emulsion and the average particle diameter (nm) of the particles of the emulsion are shown in Table 2.

Next, in the same manner as Example 1, a structure body was obtained using the obtained emulsion. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

Comparative Example 1

An emulsion with a solid matter concentration of 45% at a solid matter ratio of (hydrophobic resin particles)/(polymer emulsifier) (weight ratio)=30/70 was obtained in the same manner as Example 1, except that the charging amount of the aqueous solution (1) of the polymer emulsifier was changed to 700 g, the charging amount of water was changed to 21 g, the amount of the monomer components (composition A) was changed to 120 g and the amount of the aqueous 1% ammonium persulfate solution was changed to 48 g. The weight average molecular weight (Mw) of the resin component of the obtained emulsion and the average particle diameter (nm) of the particles of the emulsion are shown in Table 2.

Next, in the same manner as Example 1, a structure body was obtained using the obtained emulsion. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

Comparative Example 2

An emulsion with a solid matter concentration of 45% at a solid matter ratio of (hydrophobic resin particles)/(polymer emulsifier) (weight ratio)=60/40 was obtained in the same manner as Example 1, except that the aqueous solution (2) of the polymer emulsifier 400 g was used as the aqueous solution of the polymer emulsifier. The weight average molecular weight (Mw) of the resin component of the obtained emulsion and the average particle diameter (nm) of the particles of the emulsion are shown in Table 2.

Next, in the same manner as Example 1, a structure body was obtained using the obtained emulsion. The impregnating adhesion property, water penetration resistance, warm water resistance, frost damage resistance, moisture penetration resistance, mud crack resistance and blocking resistance of the obtained structure body were evaluated by the same methods as Example 1. The results are shown in Table 2.

TABLE 1

| | Monomer component composition (part) | | |
|---|---|---|---|
| | A | B | C |
| Methyl methacrylate | 61 | — | 49 |
| Styrene | — | 34 | — |
| Butyl acrylate | — | 66 | — |
| 2-ethylhexyl acrylate | 39 | — | 51 |
| Glass transition temperature | 10° C. | −20° C. | −10° C. |

TABLE 2

| | Aqueous solution of polymer emulsifier | Monomer component composition | Weight average molecular weight | Average particle diameter (nm) | Impregnating adhesion property | Water penetration resistance | Warm water resistance | Frost damage resistance | Moisture penetration resistance | Mud ceack resistance | Blocking resistance |
|---|---|---|---|---|---|---|---|---|---|---|---|
| Example 1 | (1) | A | 150000 | 35 | ○ | ○ | ○ | ○ | ○ | ○ | ◎ |
| Example 2 | (1) | B | 130000 | 33 | ○ | ○ | ○ | ○ | ○ | ○ | ○ |
| Example 3 | (4) | A | 300000 | 18 | ○ | ○ | ○ | ○ | ○ | ○ | ◎ |
| Example 4 | (4) | A | 300000 | 18 | ○ | ○ | ○ | ○ | ○ | ○ | ◎ |
| Example 5 | (4) | A | 300000 | 18 | ○ | ○ | ○ | ○ | ○ | ○ | ◎ |
| Example 6 | (1) | A | 200000 | 40 | ○ | Δ | ○ | ○ | ○ | ○ | ◎ |
| Example 7 | (1) | A | 150000 | 35 | ○ | ○ | ○ | ○ | ○ | ○ | ◎ |
| Example 8 | (3) | A | 220000 | 45 | ○ | ○ | ○ | ○ | ○ | ○ | ◎ |
| Example 9 | (1) | A | 150000 | 34 | ○ | ○ | ○ | ○ | ○ | ○ | ◎ |
| Example 10 | (1) | A | 150000 | 34 | ○ | ◎ | ○ | ○ | ○ | ○ | ◎ |
| Example 11 | (1) | C | 20000 | 36 | ○ | Δ | ○ | ○ | Δ | ○ | ○ |
| Comparative Example 1 | (1) | A | 110000 | 32 | ○ | X | X | X | X | ○ | ◎ |
| Comparative Example 2 | (2) | A | 160000 | 85 | Δ | X | Δ | ○ | Δ | ○ | ◎ |

The present application claims priority under 35 U.S.C. §119 to Japanese Patent Application No. 2004-162088, filed May 31, 2004, entitled "EMULSION RESIN COMPOSITION, PRODUCTION METHOD THEREOF AND USE THEREFOF" and Japanese Patent Application No. 2005-026212, filed Feb. 2, 2005, entitled "EMULSION, PRODUCTION METHOD THEREOF AND USE THEREFOF".

The contents of these applications are incorporated herein by reference in their entirety.

The invention claimed is:

1. An emulsion comprising a hydrophobic resin particle (A) dispersed in a water-based medium as a resin component, wherein 20 to 60% by weight in the entire resin components including the hydrophobic resin particles (A) is a polymer emulsifier (B) and the average particle diameter of the particles contained therein is 50 nm or smaller.

2. An emulsion comprising a hydrophobic resin particle (A) dispersed in a water-based medium and a polymer emulsifier (B) dissolved in the water-based medium as resin components, wherein the ratio (weight ratio) of the hydrophobic resin particle (A) and the polymer emulsifier (B) satisfies [hydrophobic resin particles (A)]/[polymer emulsifier (B)] =40/60 to 80/20, the average particle diameter of the particles contained therein is 50 nm or smaller and the weight average molecular weight (Mw) of the resin components is in a range of 40,000 to 1,000,000.

3. The emulsion according to claim 1, wherein the polymer emulsifier (B) is a water-soluble resin solubilized in water by an alkali.

4. The emulsion according to claim 1, wherein the polymer emulsifier (B) is a carboxyl group-containing polymer and 1% by mole or more of the entire carboxyl groups of the polymer is neutralized with a polyvalent metal.

5. The emulsion according to claim 3, wherein the polymer emulsifier (B) is a carboxyl group-containing polymer and 1% by mole or more of the entire carboxyl groups of the polymer is neutralized with a polyvalent metal.

6. The emulsion according to claim 1, which further comprises a pigment.

7. The emulsion according to claim 3, which further comprises a pigment.

8. The emulsion according to claim 4, which further comprises a pigment.

9. A water-based sealer which comprises the emulsion according to claim 1.

10. A water-based sealer which comprises the emulsion according to claim 3.

11. A water-based sealer which comprises the emulsion according to claim 4.

12. A water-based sealer which comprises the emulsion according to claim 6.

13. A production method of an emulsion comprising a hydrophobic resin particle (A) dispersed in a water-based medium and a polymer emulsifier (B) dissolved in the water-based medium as resin components, wherein the particles with an average particle diameter of 50 nm or smaller are produced by polymerization of monomer component (a) for forming the hydrophobic resin particle (A) in an aqueous solution (B') of the polymer emulsifier (B) by using a water-soluble initiator and the solid matter ratio (weight ratio) of the aqueous solution (B') and the monomer component (a) is adjusted to satisfy [monomer component (a)]/[aqueous solution (B')]=40/60 to 80/20.

14. The production method of an emulsion according to claim 13, wherein a water-soluble resin solubilized in water by an alkali is used as the polymer emulsifier (B).

15. The production method of an emulsion according to claim 13, wherein the aqueous solution (B') is obtained by emulsion polymerization of a monomer component (b) containing (meth)acrylic acid and esters followed by solubilization of the reaction product with an alkali.

16. A structure body comprising a porous substrate and a coating formed on the surface of the substrate,
wherein the coating is formed using the emulsion according to claim 1.

17. A structure body comprising a porous substrate and a coating formed on the surface of the substrate,
wherein the coating is formed using the emulsion according to claim 3.

18. A structure body comprising a porous substrate and a coating formed on the surface of the substrate,
wherein the coating is formed using the emulsion according to claim 4.

19. A structure body comprising a porous substrate and a coating formed on the surface of the substrate,
wherein the coating is formed using the emulsion according to claim 6.

20. A structure body comprising a porous substrate and a coating formed on the surface of the substrate,
wherein the coating is formed using an emulsion comprising a hydrophobic resin particle (A) dispersed in a water-based medium as a resin component, wherein 20 to 60% by weight in the entire resin components including the hydrophobic resin particles (A) is a polymer emulsifier (B) and the average particle diameter of the particles contained therein is 50 nm or smaller; wherein the polymer emulsifier (B) is a water-soluble resin solubilized in water by an alkali and wherein the polymer emulsifier (B) is a carboxyl group-containing polymer and 1% by mole or more of the entire carboxyl groups of the polymer is neutralized with a polyvalent metal.

* * * * *